(12) United States Patent
Jones et al.

(10) Patent No.: US 9,485,284 B2
(45) Date of Patent: Nov. 1, 2016

(54) CUSTOMIZING PARTICIPANT INFORMATION IN AN ONLINE CONFERENCE

(75) Inventors: Boland T. Jones, Atlanta, GA (US); David Michael Guthrie, Norcross, GA (US); Robert Frohwein, Atlanta, GA (US)

(73) Assignee: AMERICAN TELECONFERENCE SERVICES, LTD, Atlanta, GA (US)

( * ) Notice: Subject to any disclaimer, the term of this patent is extended or adjusted under 35 U.S.C. 154(b) by 3 days.

(21) Appl. No.: 13/822,902

(22) PCT Filed: Oct. 28, 2011

(86) PCT No.: PCT/US2011/058470
§ 371 (c)(1),
(2), (4) Date: Aug. 4, 2014

(87) PCT Pub. No.: WO2013/062597
PCT Pub. Date: May 2, 2013

(65) Prior Publication Data
US 2014/0040777 A1    Feb. 6, 2014

Related U.S. Application Data

(63) Continuation-in-part of application No. PCT/US2010/033084, filed on Apr. 30, 2010, and a continuation-in-part of application No. 12/789,993, filed on May 28, 2010.

(30) Foreign Application Priority Data

Apr. 29, 2011  (WO) ................ PCT/US2011/034421
Apr. 29, 2011  (WO) ................ PCT/US2011/034438
Apr. 29, 2011  (WO) ................ PCT/US2011/034472

(51) Int. Cl.
*H04L 29/06* (2006.01)
*H04L 12/18* (2006.01)

(52) U.S. Cl.
CPC .......... *H04L 65/403* (2013.01); *H04L 12/1827* (2013.01)

(58) Field of Classification Search
CPC .......................... G06Q 10/10; H04L 65/403
USPC ......................................................... 715/753
See application file for complete search history.

(56) References Cited

U.S. PATENT DOCUMENTS 5,960,173 A * 9/1999 Tang et al. .................... 709/201
7,487,211 B2 * 2/2009 Beavers et al. ............... 709/205

(Continued)

*Primary Examiner* — Matt Kim
*Assistant Examiner* — David Luu
(74) *Attorney, Agent, or Firm* — Smith Tempel Blaha LLC

(57) ABSTRACT

Various embodiments of systems, methods, and computer programs are disclosed for customizing participant information in an online conference. One embodiment is a method for customizing display of participant information in an online conference. The method comprises: a conferencing system establishing an online conference with a plurality of client devices via a communication network, each client device associated with a participant in the online conference; the conferencing system presenting a conference user interface to the client devices, the conference user interface displaying an interactive participant object identifying each of the participants; and during the online conference, one of the participants customizing presentation of at least one of the interactive participant objects via the conference user interface.

13 Claims, 19 Drawing Sheets

(56) References Cited

U.S. PATENT DOCUMENTS

| | | | |
|---|---|---|---|
| 7,958,453 B1* | 6/2011 | Taing | 715/744 |
| 2006/0064646 A1* | 3/2006 | Kelso | H04L 51/04 715/772 |
| 2008/0104495 A1* | 5/2008 | Craig | 715/205 |
| 2009/0249223 A1* | 10/2009 | Barsook et al. | 715/753 |
| 2010/0174780 A1* | 7/2010 | Choi | G06Q 10/10 709/204 |
| 2011/0106662 A1* | 5/2011 | Stinchcomb | 705/26.43 |
| 2011/0119597 A1* | 5/2011 | Yellamraju | G06F 3/01 715/753 |
| 2012/0290601 A1* | 11/2012 | Huang | 707/769 |
| 2015/0020003 A1* | 1/2015 | Karam | 715/756 |

* cited by examiner

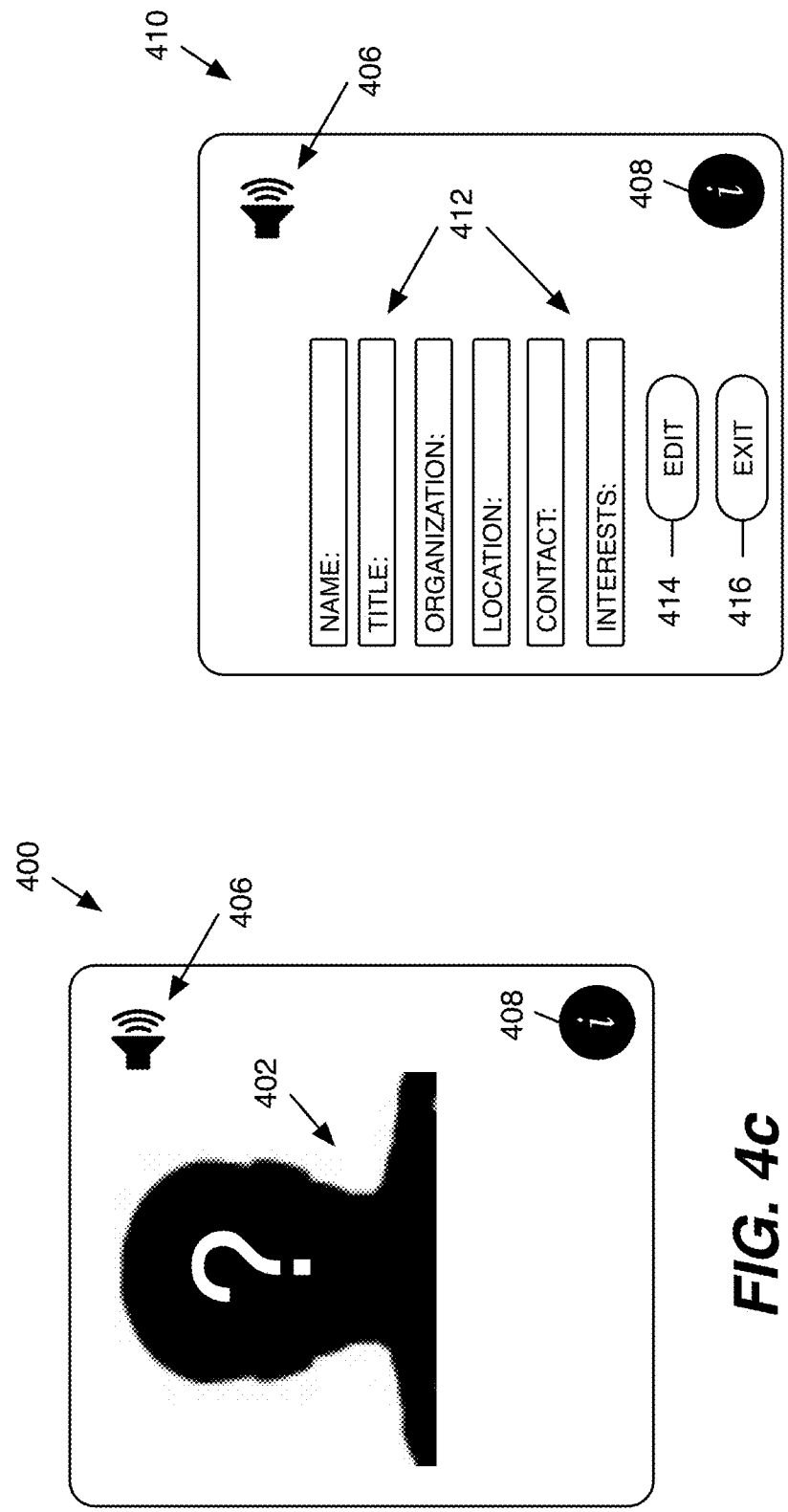

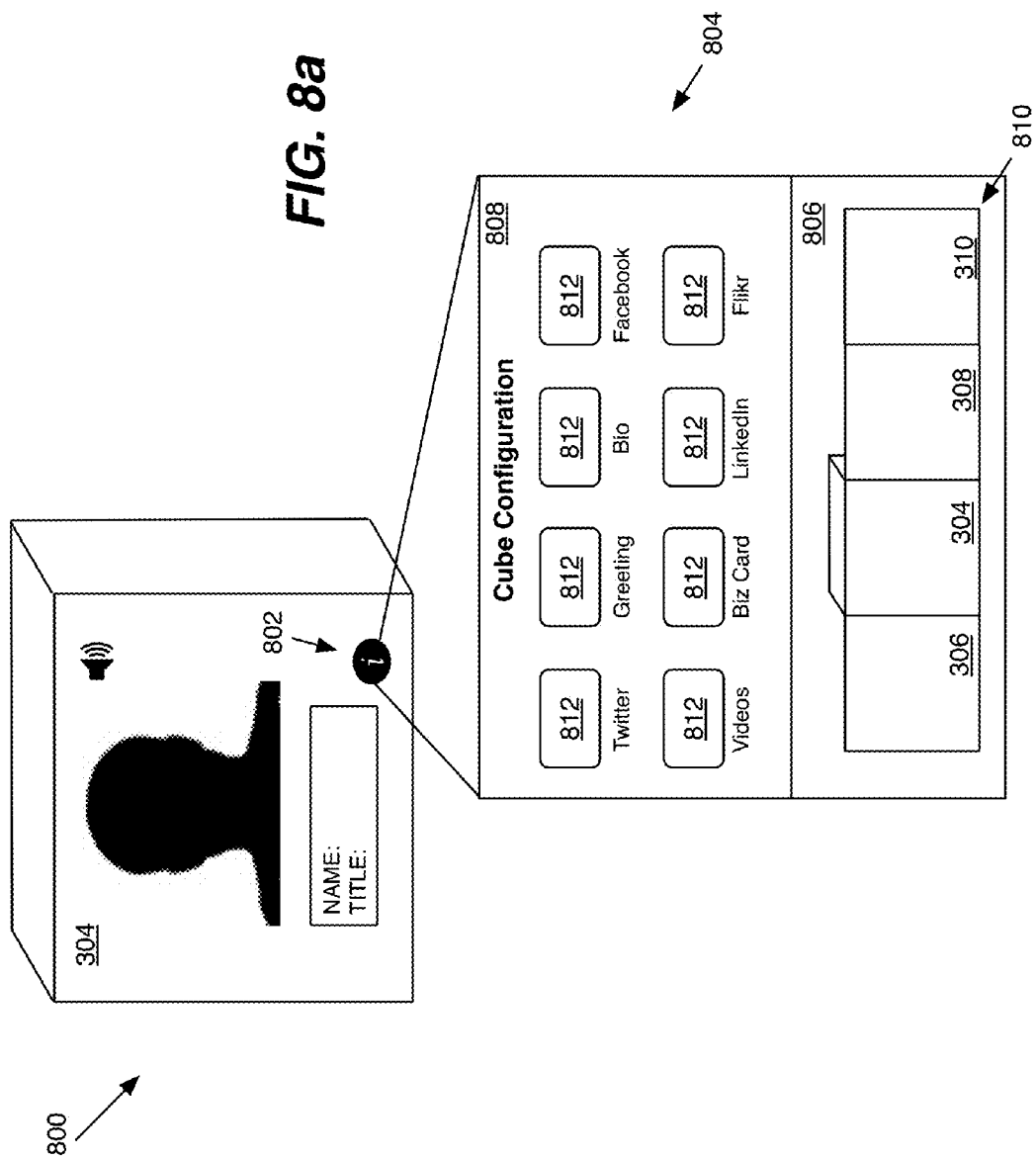

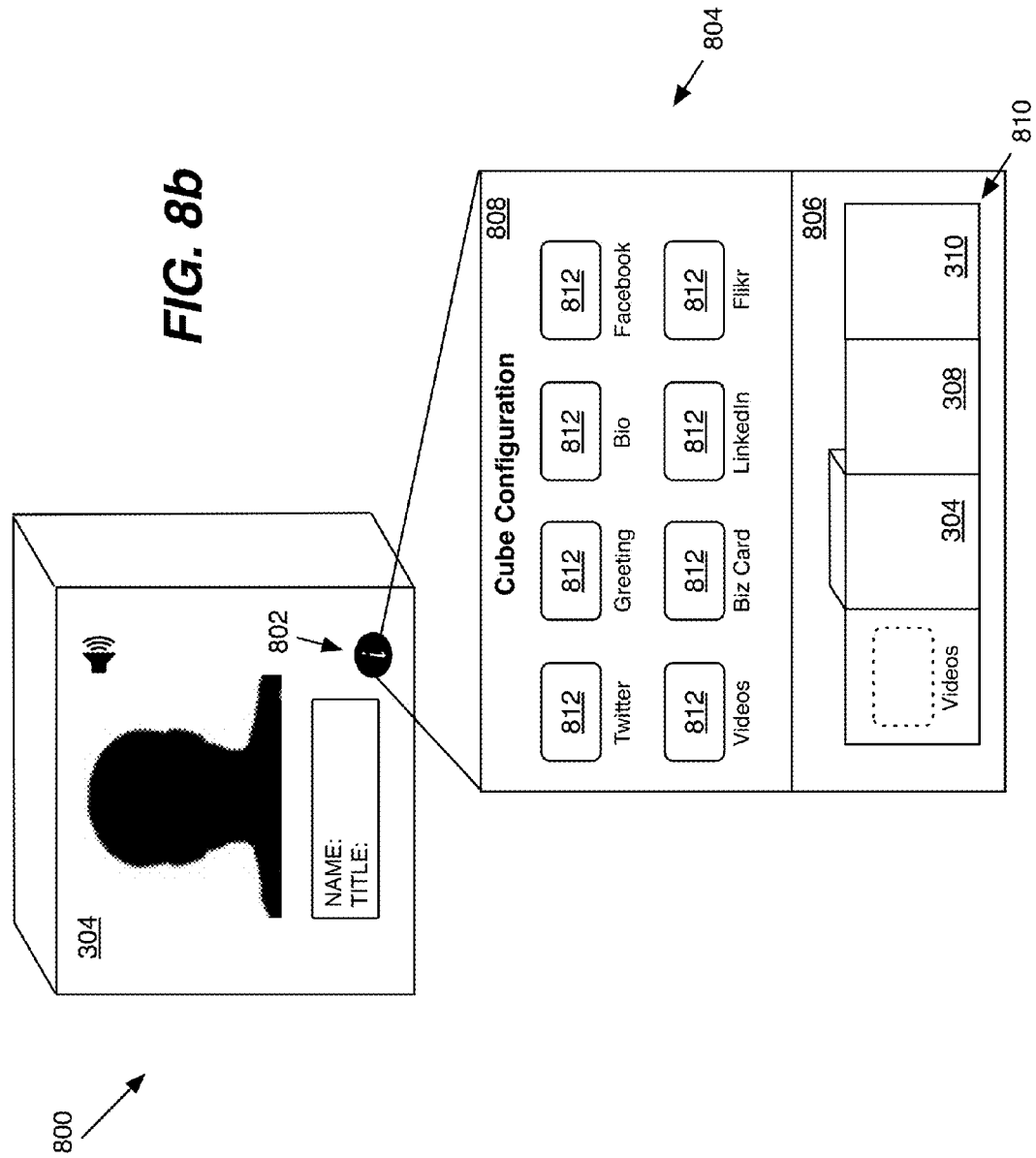

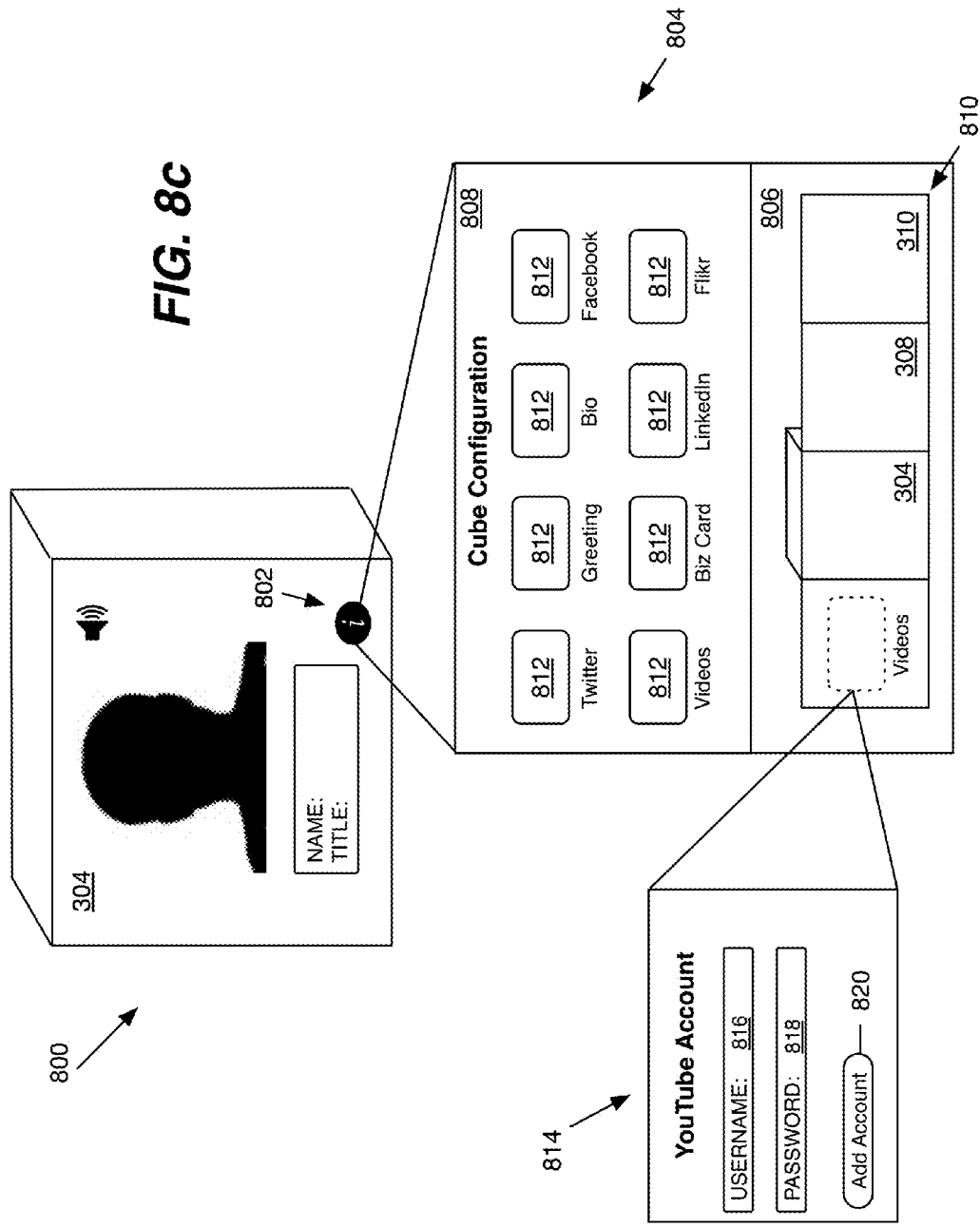

CUSTOMIZING PARTICIPANT INFORMATION IN AN ONLINE CONFERENCE

CROSS-REFERENCE TO RELATED APPLICATIONS

This application is a continuation-in-part patent application of International Patent Application Serial No. PCT/US2010/033084, entitled "Systems, Methods, and Computer Programs for Providing a Conference User Interface" and filed Apr. 30, 2010 (Applicant: American Teleconferencing Services, Ltd).

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of systems, methods, and computer programs are disclosed for customizing participant information in an online conference. One embodiment is a method for customizing display of participant information in an online conference. The method comprises: a conferencing system establishing an online conference with a plurality of client devices via a communication network, each client device associated with a participant in the online conference; the conferencing system presenting a conference user interface to the client devices, the conference user interface displaying an interactive participant object identifying each of the participants; and during the online conference, one of the participants customizing presentation of at least one of the interactive participant objects via the conference user interface.

Another embodiment is a computer program embodied in a computer readable medium and executable by a processor for providing an online conference. The computer program comprises: logic configured to establish an online conference with a plurality of client devices via a communication network, each client device associated with a participant in the online conference; logic configured to present a conference user interface to the client devices, the conference user interface displaying an interactive participant object identifying each of the participants; logic configured to receive, from one or more of the client devices, configuration parameters for customizing the corresponding interactive participant object; and logic configured to present the corresponding interactive participant object in the conference user interface according to the configuration parameters.

Another embodiment is computer system comprising a conferencing system and a server. The conferencing system establishes an audio conference with a plurality of client devices via a communication network. The server is configured to communicate with the conferencing system and the plurality of client devices via the communication network and present a conference user interface to the client devices. The conference user interface displays an interactive participant object identifying each of the participants. The server comprises one or more processors and a participant customization module, which is stored in a computer readable medium and executed by the processors for enabling the participants to customize presentation of the interactive participant objects. The participant customization module comprises: logic configured to receive, from one or more of the client devices, configuration parameters for customizing the corresponding interactive participant object; and logic configured to present the corresponding interactive participant object in the conference user interface according to the configuration parameters.

BRIEF DESCRIPTION OF THE DRAWINGS

FIGS. 4a-4d illustrate an embodiment of a customizable participant object.

FIG. 8a illustrates an embodiment of a participant object for launching a customization component.

FIG. 8b illustrates the customization component of FIG. 9a in which a drag-and-drop feature is used to configure one of the display regions.

FIG. 8c illustrates the customization component of FIG. 9b with a settings menu for configuring the selected display region.

DETAILED DESCRIPTION

Various embodiments of systems, methods, and computer programs are disclosed for enabling a participant in an online conference to customize participant information displayed in a conference user interface. The online conference may be used for conferences, meetings, groupings or other types gatherings (collectively, a "conference" with a system that provides the conference user interfaces for the conference being referred to herein as a "conferencing system") for any variety of purposes of one or more people, groups or organizations (including combinations thereof and collectively referred to as "participants") with or without an audio component, including, without limitation, enabling simulcast audio with such conference for the participants. The online conference and the conference user interface may be configured to provide any desirable content and/or functionality and may support various user interface and/or conferencing features, including any features described in the above-referenced related patent application.

Figure 1:
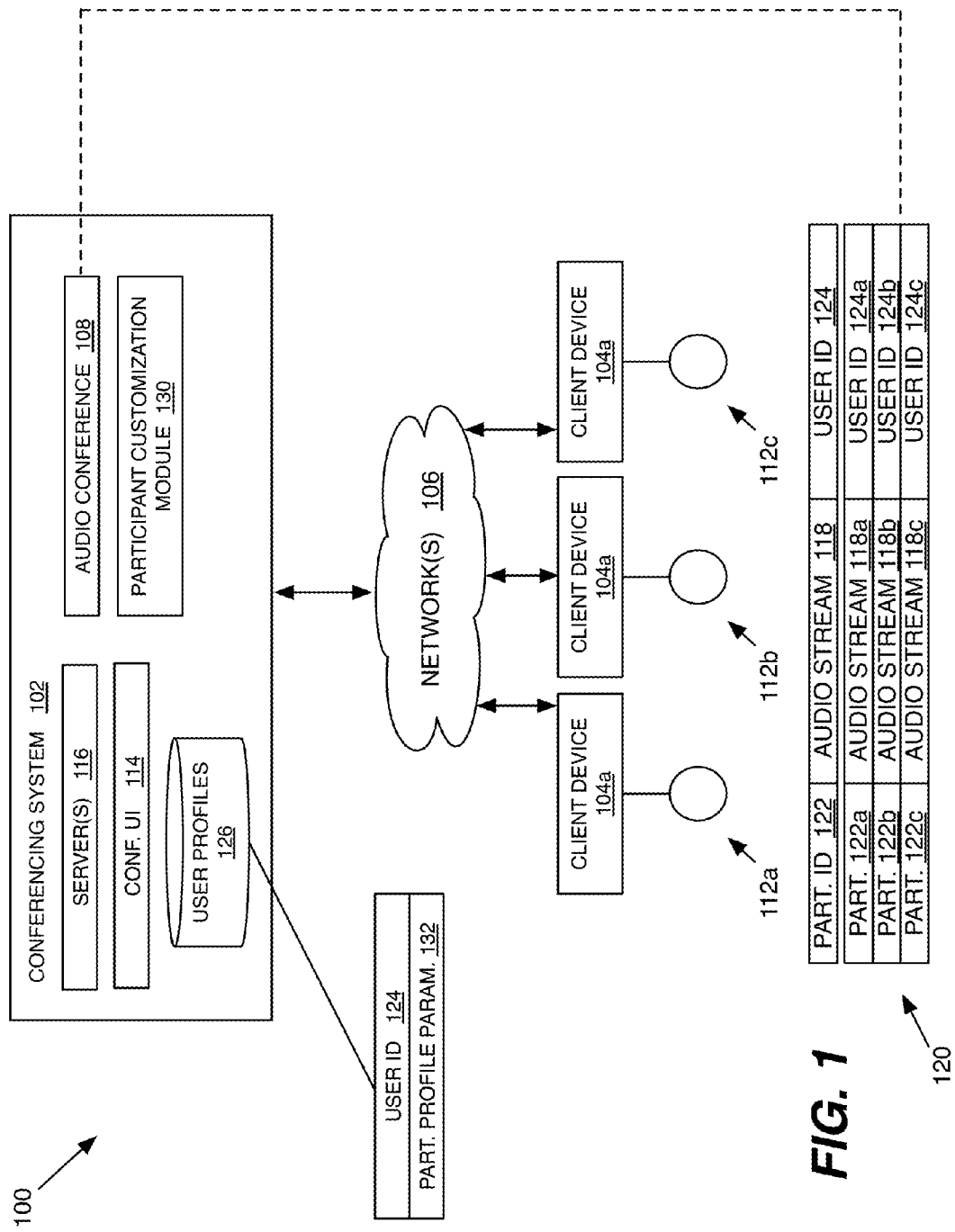
FIG. 1 is a block diagram illustrating an embodiment of a computer system for customizing participant information in an online conference.

FIG. 1 illustrates an embodiment of a computer system 100 for an online conference (e.g., an audio conference 108). The computer system 100 enables participants 112 to customize various types of information and related functionality that is presented to other participants via a conference user interface 114. The computer system 100 comprises a conferencing system 102 and a plurality of client devices 104 connected via one or more communication networks 106. The network(s) 106 may support wired and/or wireless communication via any suitable protocols, including, for example, the Internet, the Public Switched Telephone Network (PSTN), cellular or mobile network(s), local area network(s), wide area network(s), or any other suitable communication infrastructure. Client devices 104a, 104b, and 104c may be associated with participants 112a, 112b, and 112c, respectively, participating in the the audio conference 108. A participant 112 may comprise a "host" or "participant" and such terms merely refer to different user roles or permissions associated with the audio conference 108. For example, the "host" may be the originator of the audio conference 108 and, consequently, may have user privileges that are not offered to the participants. Nonetheless, it should be appreciated that the terms "host," "participant," and "user" may be used interchangeably depending on the context in which it is being used.

The client devices 104 may comprise any desirable computing device, which is configured to communicate with the conferencing system 102 and server(s) 116 via the networks 106. The client device 104 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 102 and/or the server(s) 116 via one or more networks 106. The client device 104 may include client software (e.g., a browser, plug-in, or other functionality) configured to facilitate communication with the conferencing system 102 and the server 116. It should be appreciated that the hardware, software, and any other performance specifications of the client device 104 are not critical and may be configured according to the particular context in which the client device 104 is to be used.

In the embodiment of FIG. 1, the conferencing system 102 generally comprises a communication system for establishing an online conference (e.g., an audio conference 108) between the client devices 104. The conferencing system 102 may support audio via a voice network and/or a data network. In one of a number of possible embodiments, the conferencing system 102 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 102 may support various alternative platforms, technologies, protocols, standards, features, etc. Regardless of the communication infrastructure, the conferencing system 102 may be configured to establish an audio connection with the client devices 104, although in some embodiments the audio portion may be removed. The conferencing system 102 may establish the audio conference 108 by combining audio streams 118a-118c associated with client devices 104a-104c and corresponding participants 112a-112c.

As illustrated in FIG. 1, the conferencing system 102 may maintain a database 120 stored in a memory. Database 120 may comprise a list of participant identifiers 122 identifying each of the participants. Each participant identifier 122 is logically associated with a corresponding audio stream 118 that identifies the participant, a particular connection to the appropriate client device 104, and a user identifier 124 from user profiles database 126. User profiles database 126 may store any suitable account information for participants 112, as described in the above-referenced patent application.

Conferencing system 102 may comprise one or more server(s) 116 that are configured to establish the audio conference 108. Conferencing system 102 may further comprise a participant customization module 130 configured to enable participants 112 to customize their virtual presence in the conference user interface 114. The conference user interface 114 may be presented via a client application (e.g., a browser, one or more browser plug-ins, and/or a special-purpose client). It should be appreciated that the conference user interface 114 may include logic located and/or executed at the client device 104, the conferencing system 102, or any combination thereof, and may be presented to and displayed via a graphical user interface and an associated display (e.g., touchscreen display device or other display device).

The participant customization module 130 (and any other associated control and presentation modules) may be embodied in memory and executed by one or more processors. It should be appreciated that any aspects of the participant customization module 130 may be stored and/or executed by the client devices 104, the conferencing system 102, the servers 116, or other related server(s) or web services.

Figure 2:
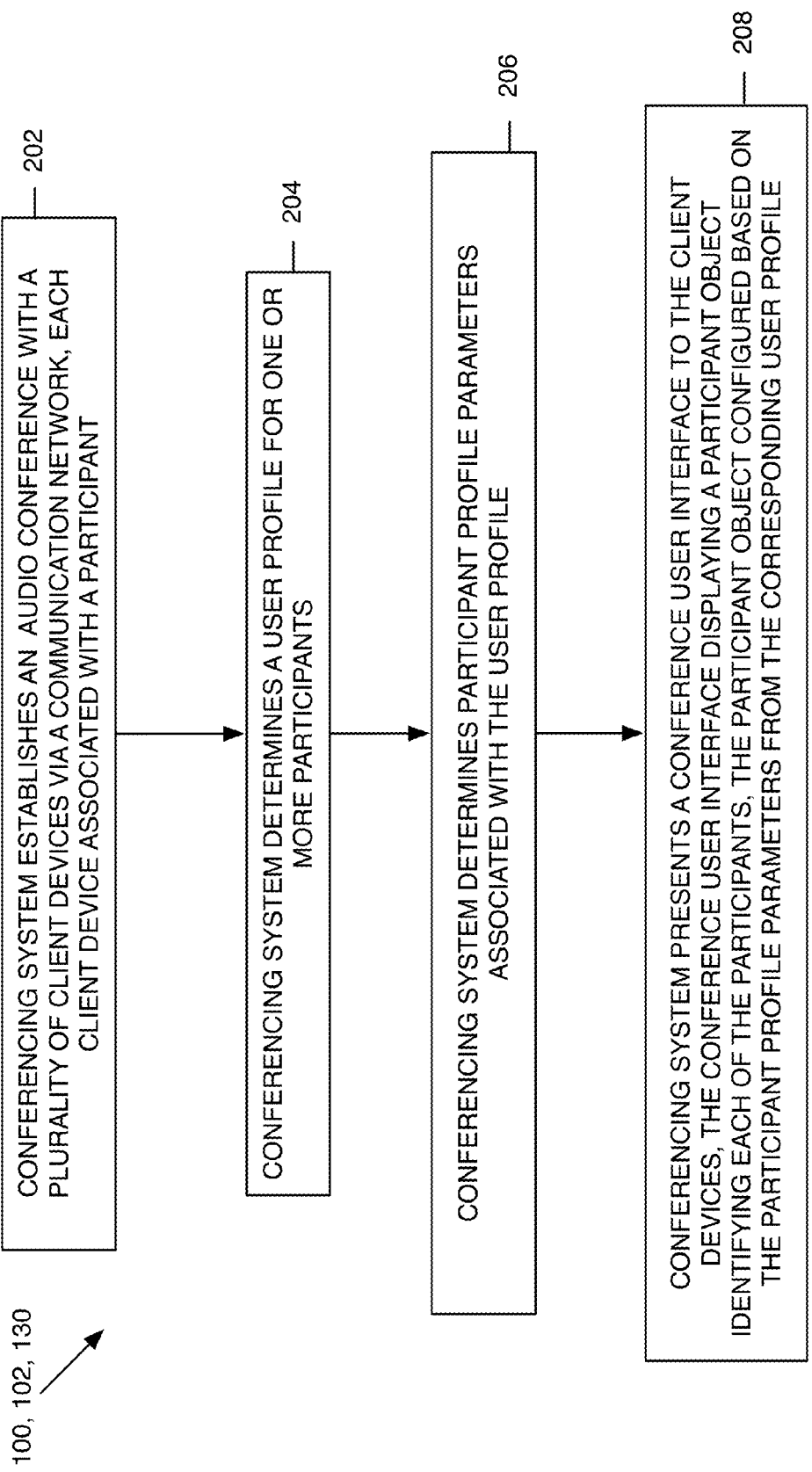
FIG. 2 is a flowchart illustrating the architecture, operation, and/or functionality of the participant identification customization module of FIG. 1.

In general, the participant customization module 130 comprises the logic and/or functionality for enabling participants 112 to configure or customize various aspects of the conference user interface 114. FIG. 2 illustrates one embodiment of a method for enabling participants 112 to customize a virtual presence in the online conference. At block 202, the conferencing system 102 establishes an audio conference 108 with the client devices 104a, 104b, and 104c via network(s) 106. At block 204, the conferencing system 102 determines a user profile 126 for at least one of the participants 112. At block 206, the conferencing system 102 reads the user profile 126 and determines one or more associated participant profile parameters 132. It should be appreciated that the participant profile parameters 132 may comprise any suitable parameters for defining, configuring, and presenting participant-related information in the conference user interface 114 (e.g., name, job title, contact information, photographs, social networking profiles, social networking feeds, personal greetings, or any other user-specific information or presentation effects).

Figure 3A:
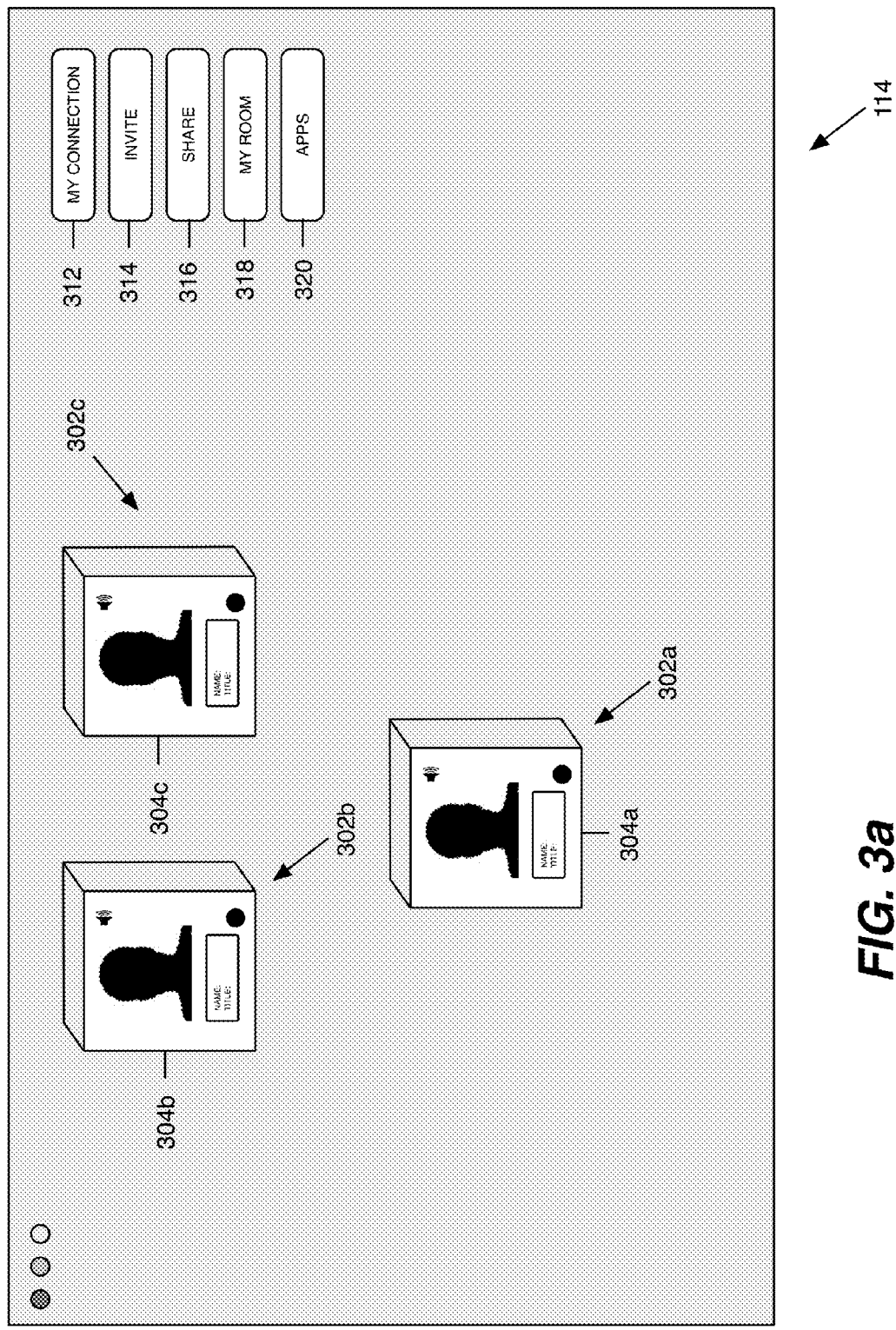
FIGS. 3a & 3b are user interface screen shots illustrating an embodiment of the conference user interface in FIG. 1, which displays a customizable participant object for each participant in the online conference.

At block 208, the conferencing system 102 presents the conference user interface 114 to the client devices 104. FIG. 3a illustrates an exemplary embodiment of the conference user interface 114 in which each participant 112 is identified with an interactive participant object 302. Participant 112a is identified with participant object 302a, participant 112b with participant object 302b, and participant 112c with participant object 302c. The participant objects 302 may comprise a default display 304 for displaying a graphic, icon, avatar, or photograph of the participant 112, as well as the participant's name, title, or any other customizable information.

As described below in more detail, a participant 112 may customize various aspects of their corresponding interactive participant object 302. The interactive participant object 302 may display similar information as described in the above-referenced patent application and may implement similar or other user interface or other functions and features. The interactive participant object 302 may comprise one or more user-selectable display portions for presenting participant information or related features. In the embodiment illustrated in FIGS. 3a & 3b, the interactive participant objects 302 may comprise a cube or other shape having a plurality of display faces. When a participant selects a user interface component, the cube may be expanded to display one or more faces.

Figure 3B:
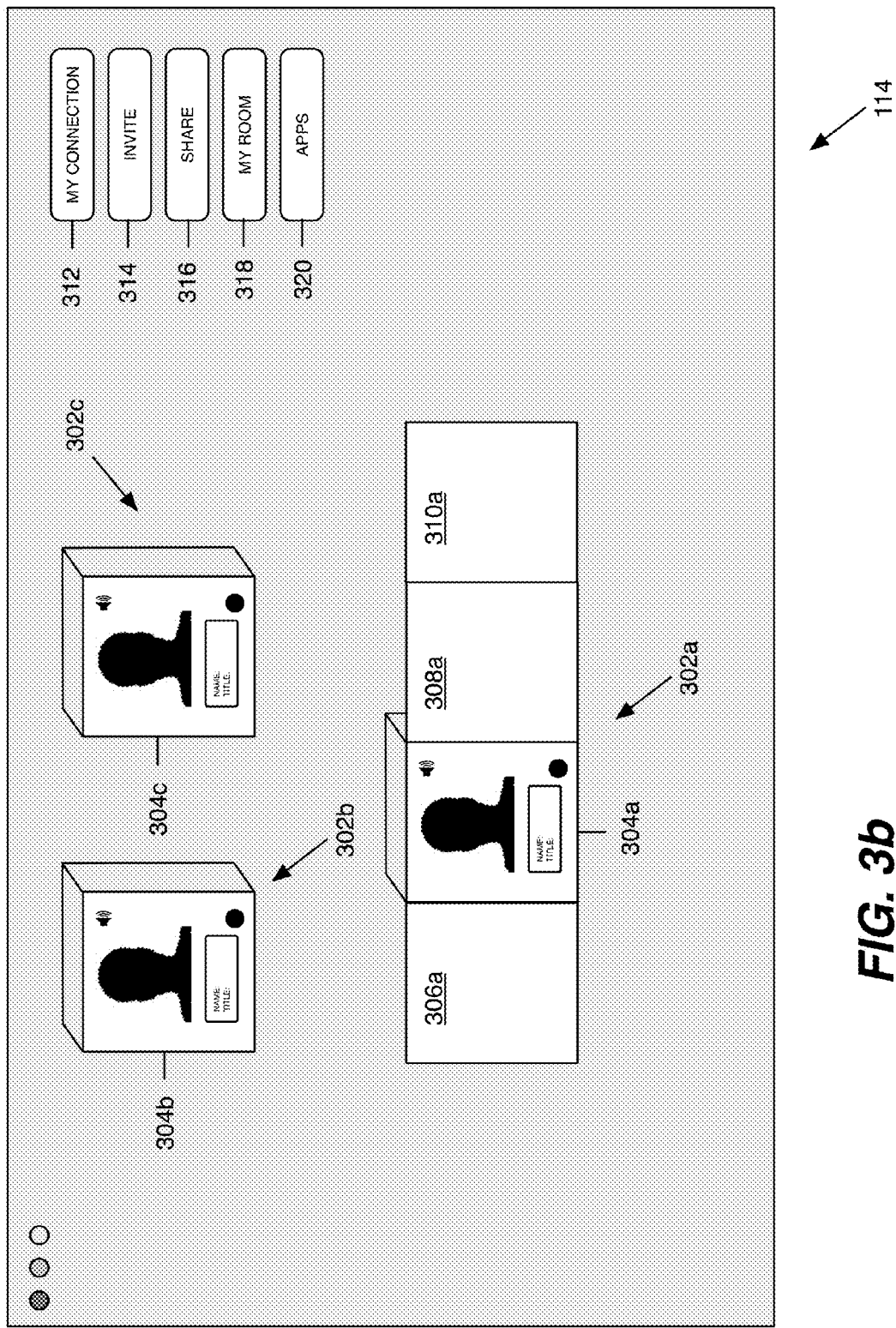
Figure 4B:
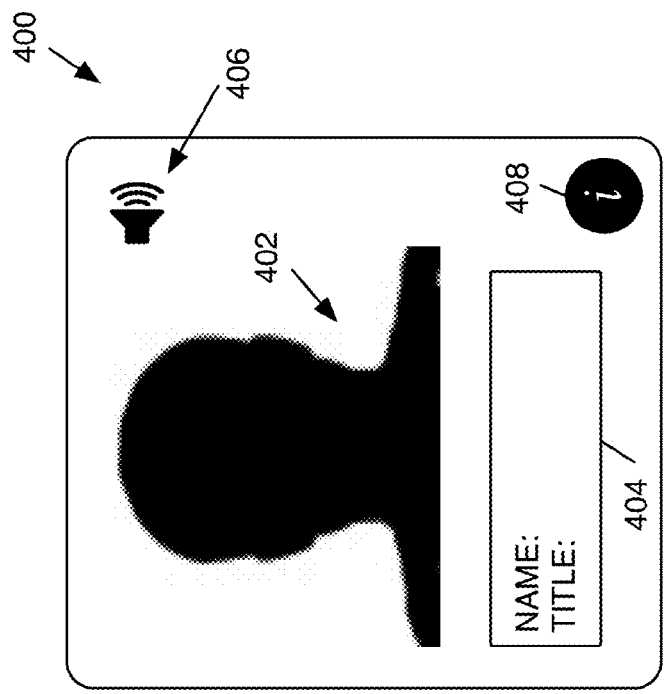
Figure 4A:
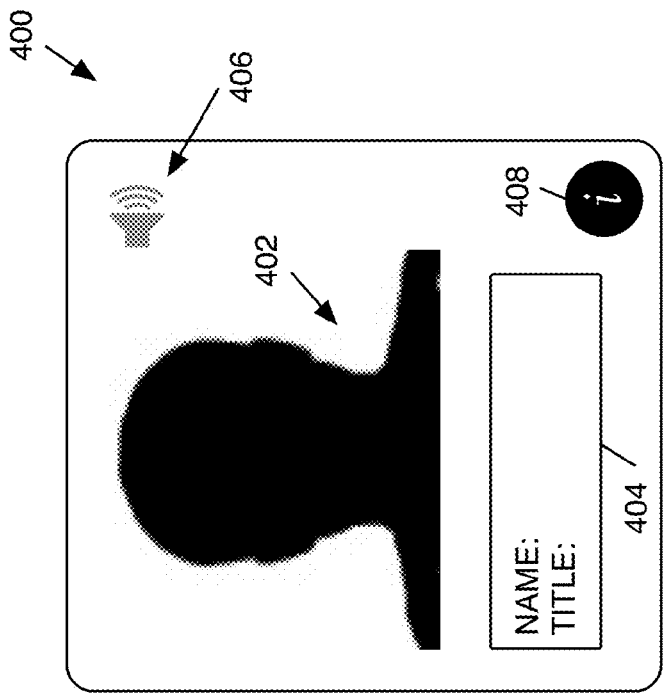

FIG. 3b illustrates the conference user interface 114 in which a participant object 302a has been selected by one of the participants 112. The user selection may trigger the display of cube faces 306a, 308a, and 310a. Each face may display additional information about the associated participant. In an embodiment, the cube faces may be configurable by the participant and may display, for example, a social networking profile, updates to a social networking communication feed, video, graphics, images, or any other content. The cube faces may be further selected to return to the original collapsed cube. In another embodiment, the participant object 302 may be rotated (either automatically or via user selection) to display the respective cube faces 306a, 308a, and 310a. It should be appreciated that the participant objects 302 may be configured with various visual effects and/or interactive functionality.

As further illustrated in FIGS. 3a & 3b, the conference user interface 114 may comprise one or more selectable components for accessing various conferencing features. A my connection component 312 may launch a display for enabling a participant 112 to configure the existing connection between the client device 104 and the conferencing system 102. The participant 112 may disconnect a connection to the audio conference 108, establish a new connection to the audio conference 108 (e.g., by dial-out), or reconfigure the existing connection to the audio conference 108.

An invite component 314 may launch a menu for enabling a participant 112 to invite additional participants to the online conference. Additional participants may be invited by, for example, dialing out to a telephone number, sending an email including information for accessing the conferencing system 102, or sending a message to a web service, such as, for example, a social networking system. A share component 316 may launch a menu (not shown) for enabling a participant 112 to insert and share media with other participants in the online conference.

A my room component 318 may launch a display for enabling a participant 112 to configure the appearance of the conference user interface 114. In an embodiment, the participant 112 may configure the arrangement of the participant objects 302, specify a location view (as described in the above-reference international patent application), or configure any other presentation parameter. My room component 318 may be configured to launch the participant identification customization module 130 (FIG. 1).

An apps component 320 may launch a menu for enabling a participant 112 to launch, view, or purchase various conference applications provided by the conferencing system 102.

FIGS. 4a-4d illustrate another embodiment of a customizable participant object 400 for identifying participants 112 in the conference user interface 114. Participant object 400 may comprise a graphical representation 402, profile information 404, an audio indicator 406, and a business card component 408. The graphical representation 402 may comprise a picture, photograph, icon, avatar, etc. for identifying the corresponding participant 112. The graphical representation 402 may comprise an image that is uploaded to the server 116, imported from a social networking profile, or selected and/or customized from predefined images. Graphical representation 402 may also comprise a default image (FIG. 4c) if one has not been defined by a participant 112.

The profile information 404 may comprise information provided by the participant 112 and stored in user profiles database 126 (FIG. 1). The audio indicator 406 visually identifies when the associated participant 112 is speaking during the audio conference 108 by monitoring the audio streams 118. The audio stream 118 may be logically associated with the corresponding audio indicator 406 according to the participant identifier 122 or user identifier 124. When a participant 112 is speaking, the audio indicator 406 may be displayed in a first visual state (FIG. 4a), such as, by graying out the audio indicator 406. When the participant 112 is speaking, the audio indicator 406 may be displayed in a second visual state (FIG. 4b), such as, by blacking out the audio indicator 406. It should be appreciated that any visual and/or audio distinctions may be employed to identify a speaking participant in the conference user interface 114.

In an embodiment, selecting a user interface component 408 may launch a business card component that, when selected, displays further information about the participant 112. The business card component may trigger the display of any additional participant profile or identification information. In the embodiment illustrated in FIG. 4d, when the component 408 is selected, the participant object 400 "flips" to the business card component 410, which displays additional parameters 412 (e.g., name, title, organization, location, contact information, interests, or other biographical information). The business card component 410 may further comprise a participant profile control 414, which comprises a user interface control for enabling the participants 112 to edit their own, or another participant's, information during the audio conference 108. An "exit" button 416 may be selected to "flip" the object to the default display.

Figure 5A:
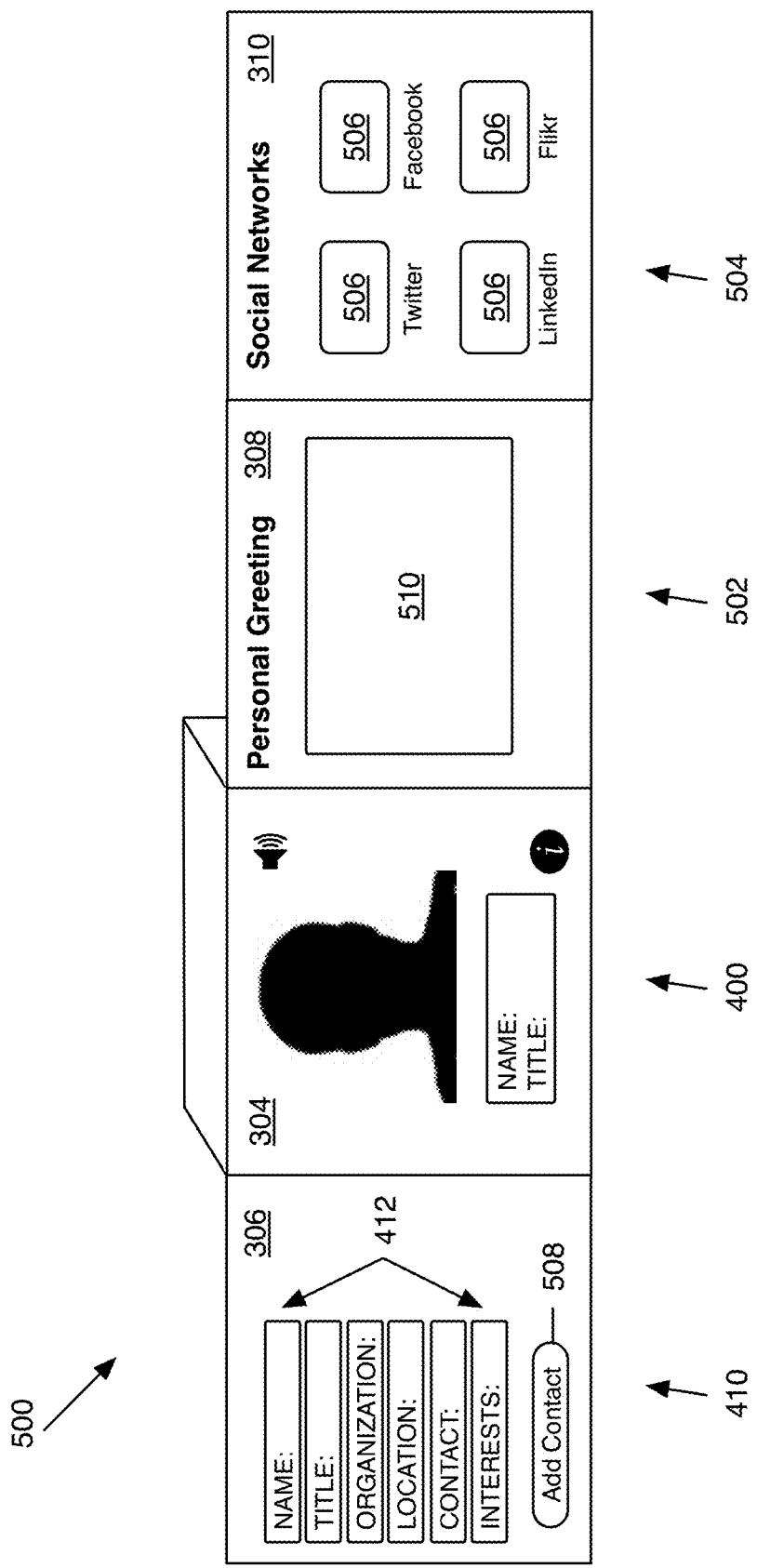
FIG. 5a illustrates an embodiment of a customizable participant object displaying a default participant image, a business card component, a personal greeting, and a social networks component.
Figure 5B:
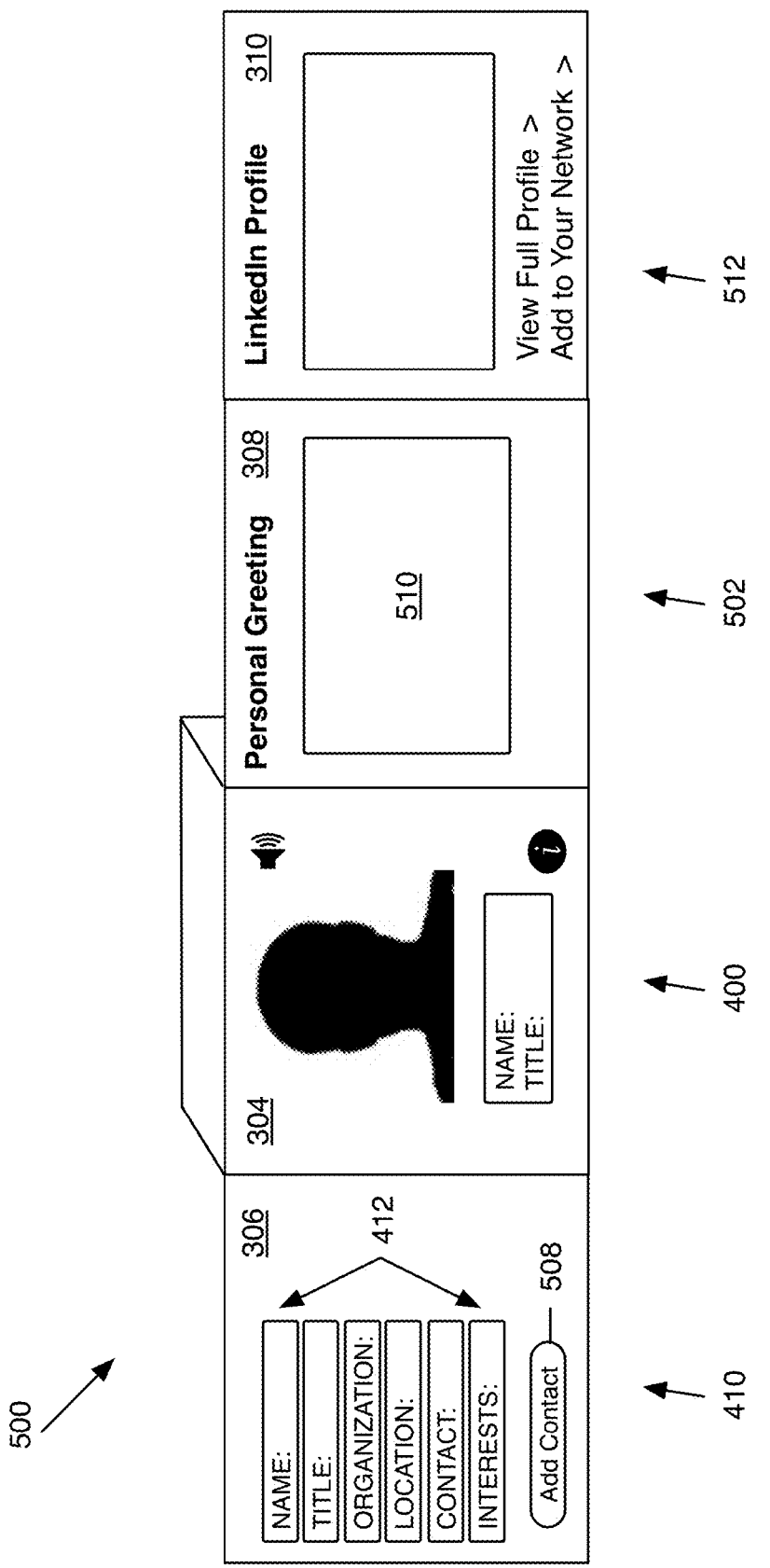
FIG. 5b illustrates the customizable participant object of FIG. 5a in which the social networks component displays a social networking profile.
Figure 5C:
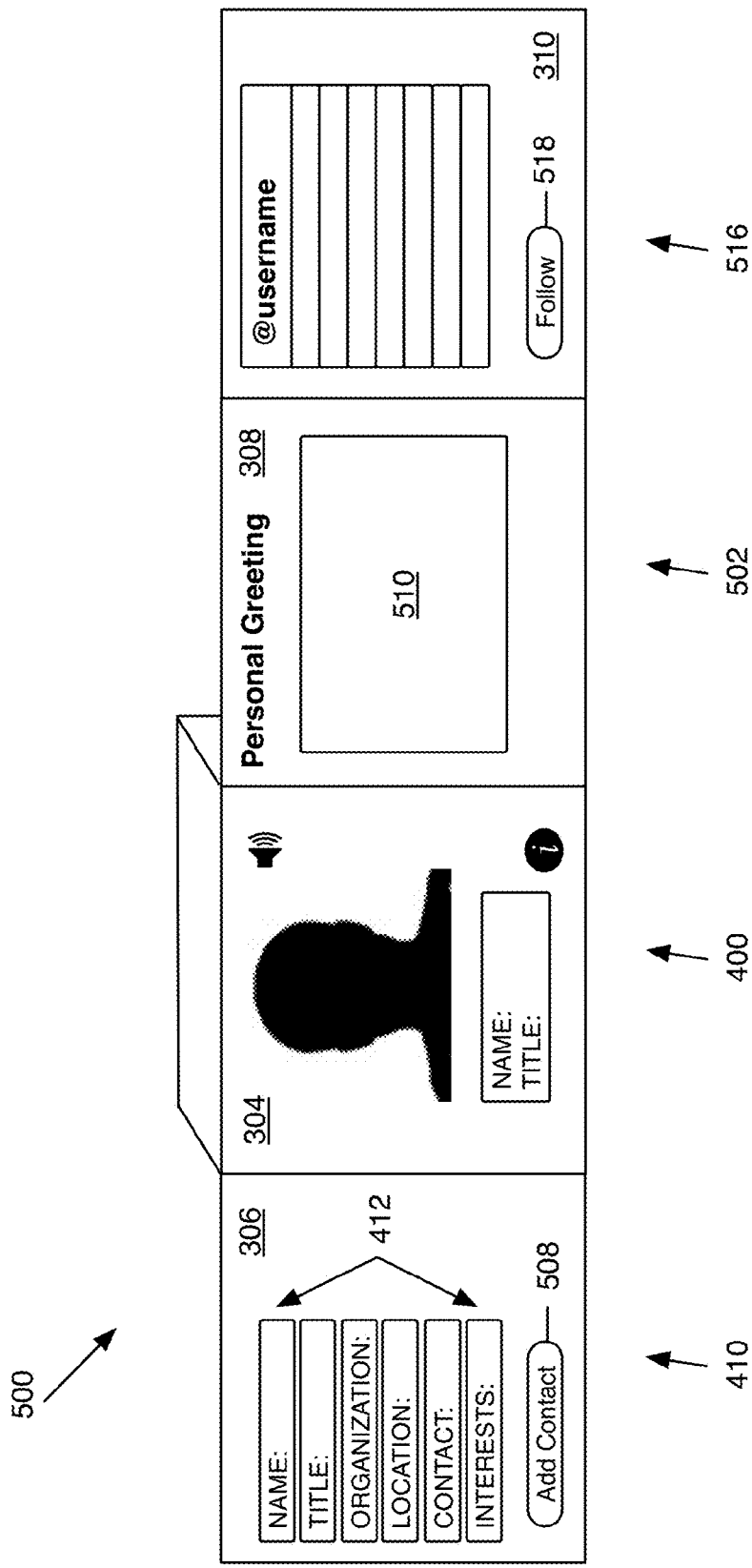
FIG. 5c illustrates the customizable participant object of FIG. 5a in which the social networks component displays a social networking feed.
Figure 5D:
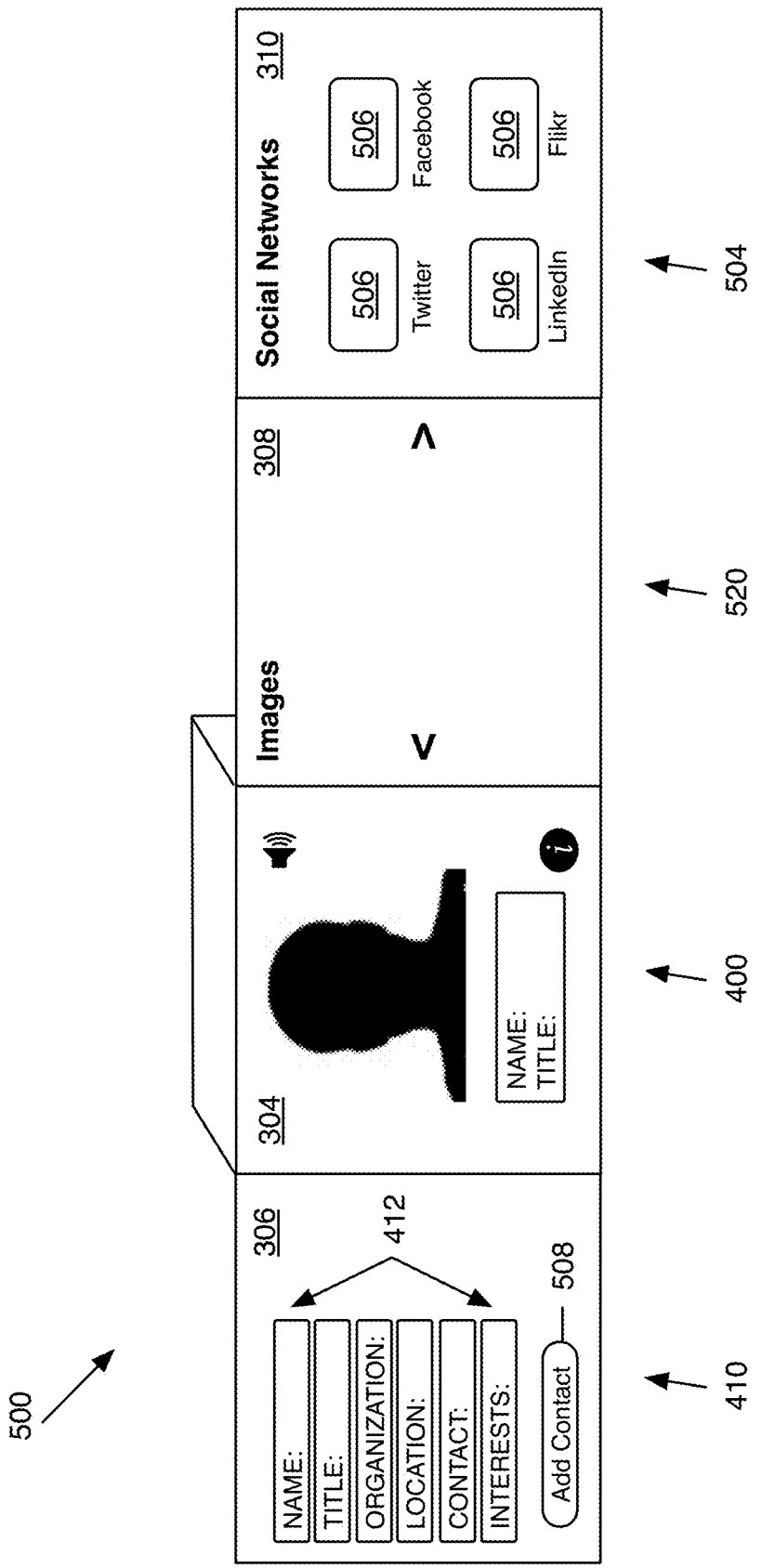
FIG. 5d illustrates another embodiment of the customizable participant object for displaying participant photos.

FIGS. 5a-5d illustrate another embodiment of a participant object 500 that may be customized by a participant 112. Participant object 500 comprises a plurality of user-selectable display portions (e.g., cube faces 304, 306, 308, and 310). Cube faces 304 and 306 may display object 400 (FIG. 4a) and business card component 410 (FIG. 4d), respectively. Cube face 308 may be customized to display a personal greeting 502 comprising content 510 (e.g., text, graphics, video). Cube face 310 may comprise a menu 504 for listing available social networking accounts (buttons 506) associated with the participant 112. As described in the above-referenced patent application, the conferencing system 102 may be configured to communicate with social networking systems via an API. During the online conference, other participants 112 may select one of the buttons 506 and view the participant's social networking profile 512 (FIG. 5b) displayed in the cube face 310. One or more links may also be displayed for viewing the participant's full profile, as well as sending a request to join the participant's social network. FIG. 5c illustrates another embodiment in which cube face 310 displays a social networking feed 516 and a button 518 to subscribe to or follow the social networking feed 516. FIG. 5d illustrates a further embodiment in which cube face 308 comprises an image application 520 for scrolling through images.

Figure 6A:
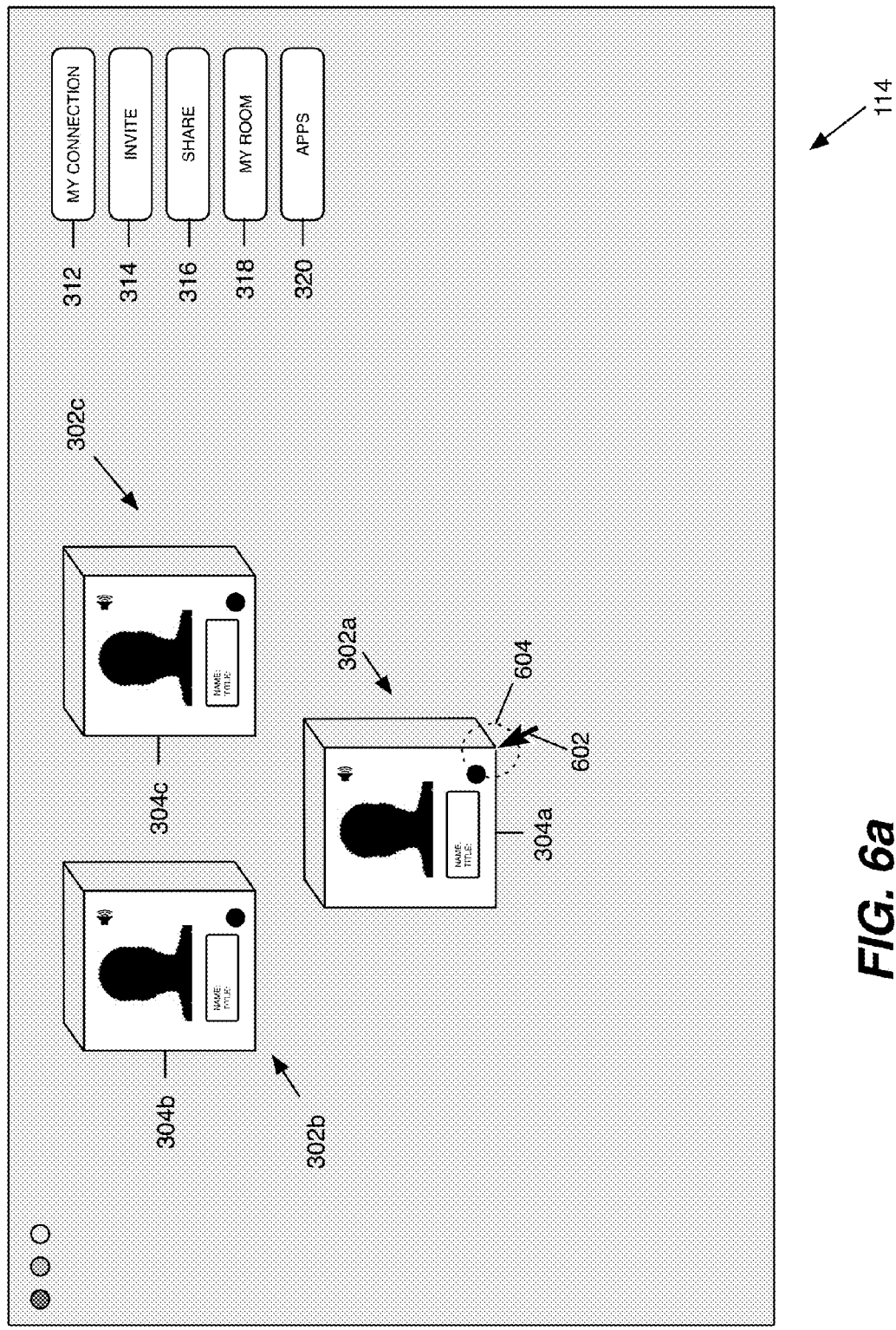
FIGS. 6a & 6b are user interface screen shots of an embodiment of the conference user interface for customizing the size of the participant object.
Figure 6B:
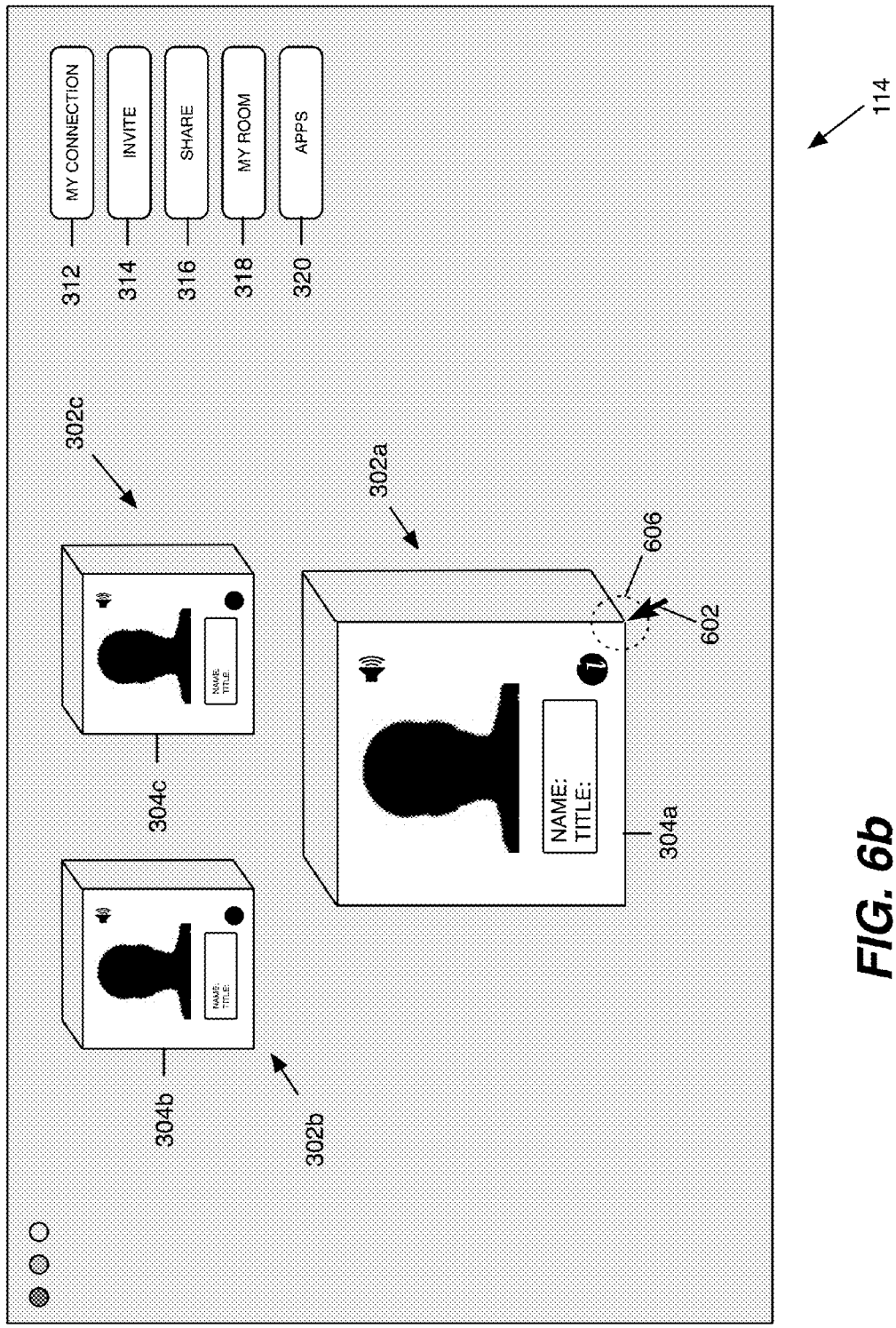
Figure 7A:
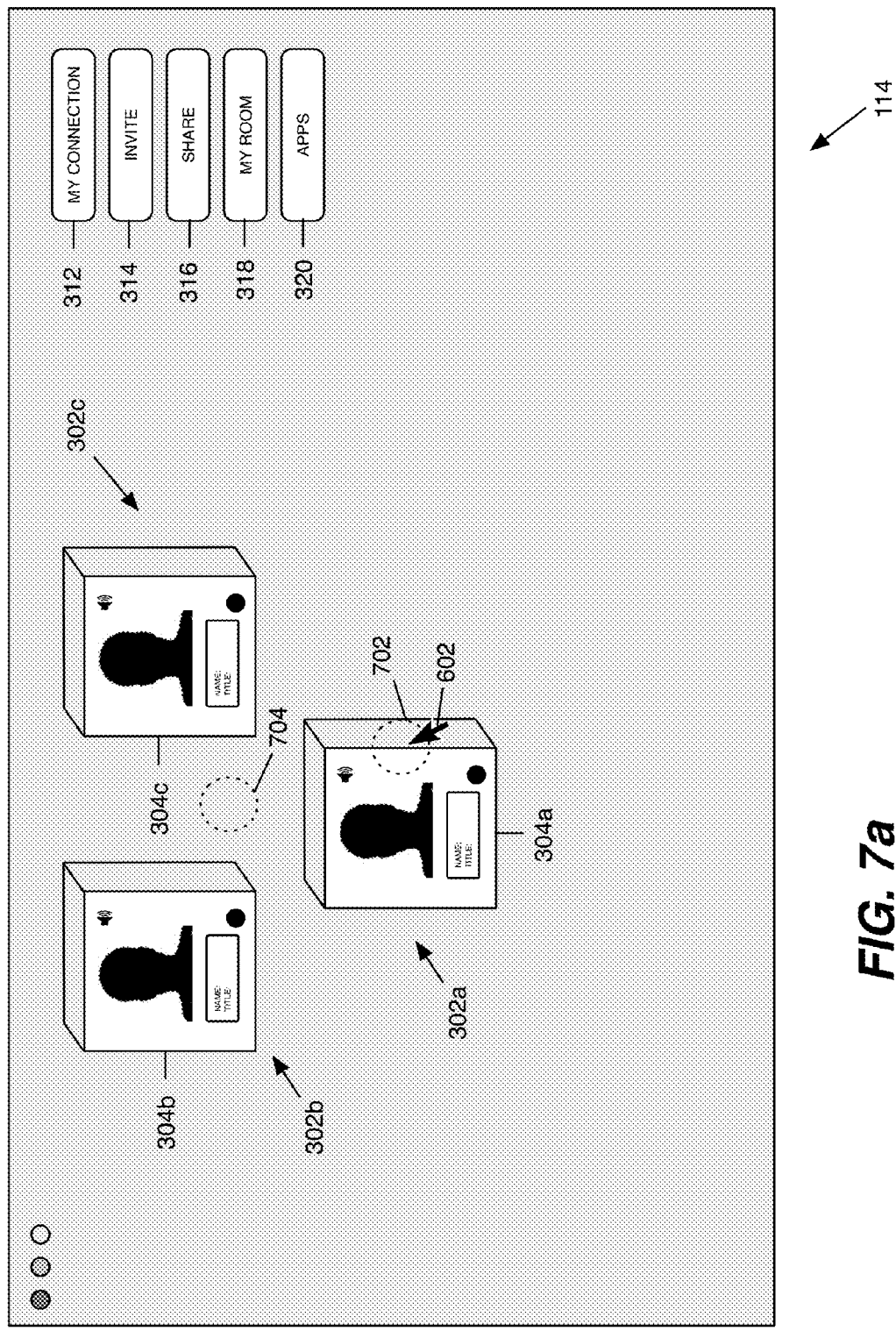
FIGS. 7a & 7b are user interface screen shots of another embodiment of the conference user interface for customizing the arrangement of the participant objects.
Figure 7B:
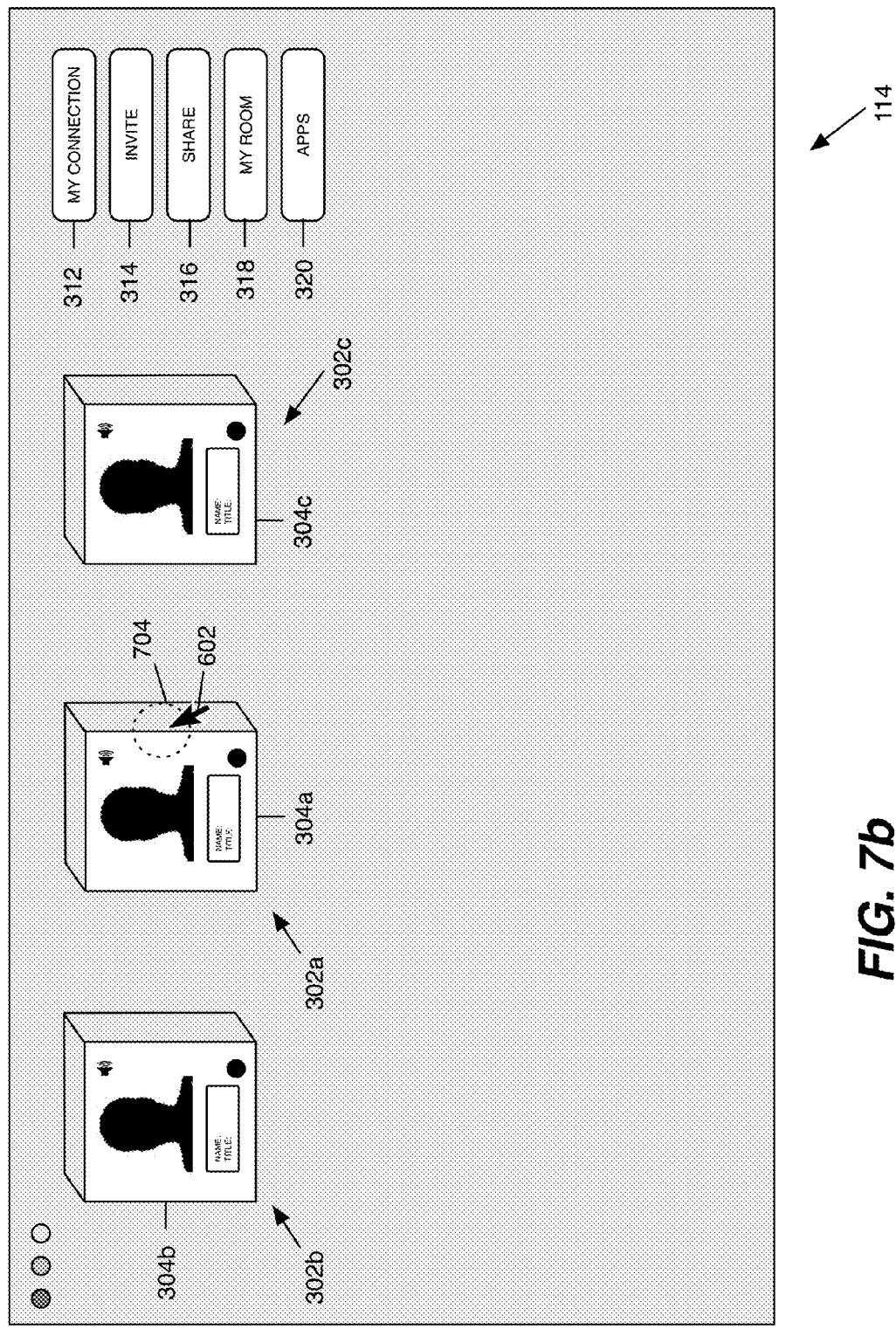

In another embodiment, a participant 112 may also customize various aspects of the participant objects 302 presented in the conference user interface 114 during the online conference. As illustrated in FIGS. 6a & 6b, any of the participants 112 may resize a particular participant object 302 by selecting an area 604 with, for example, a cursor 602 (FIG. 6a), and then performing a drag-and-drop operation to another area 606 (FIG. 6b). In response to the drag-and-drop operation, the participant object 302 may be either reduced or increased in size. As illustrated in FIGS. 7a & 7b, participant objects 302 may be rearranged with a similar drag-and-drop operation by selecting an area 702 and then dragging the participant object 302 to another area 704. In response to the drag-and-drop operation, the participant objects 302 may be automatically rearranged. It should be appreciated that the resize and rearrange customizations may also be implemented with appropriate touch gestures when the client device 104 includes a touchscreen display device.

In another embodiment, a participant 112 may customize their own participant object 302 directly from the user interface object during the online conference. For example, as illustrated in FIG. 8a, a participant object 800 may comprise a configuration button 802 that launches a cube configuration window 804. Window 804 comprises an upper panel 808 and a lower panel 806. The lower panel 806 may display a simulated participant object 810 having corresponding cube faces 304, 306, 308, and 310. The upper panel 808 may comprise a plurality of buttons 812 corresponding to the various types of information and features that may be displayed in cube faces 304, 306, 308, and 310. A participant 112 may configure one or more of the cube faces 304, 306, 308, and 310 by selecting a button 812 and dragging the user interface object to the desired cube face. In FIG. 8b, a videos button 812 has been dragged and dropped onto the cube face 306. In response to the drag-and-drop or other operation, a menu 814 may be displayed for enabling the participant 112 to configure and link the cube face 306 to the participant's video sharing account (FIG. 8c). Menu 814 may include text boxes 816 and 818 for inputting a username and password, respectively, for the video sharing account. After inputting the username and password, the participant 112 may select an "add account" button 820, which initiates the configuration of the cube face 306 to display the participant's videos.

Figure 9:
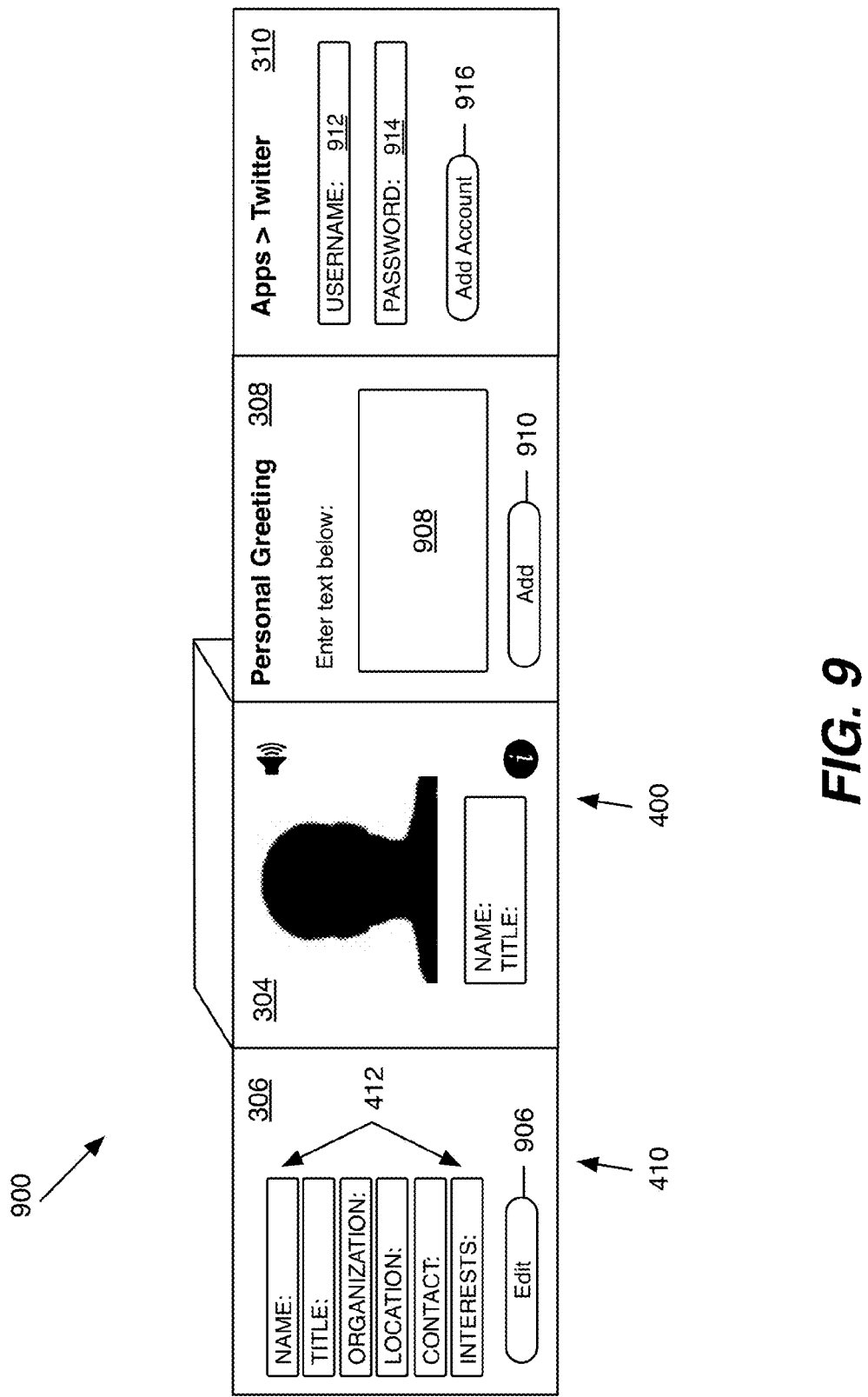
FIG. 9 illustrates another embodiment of a participant object for enabling a participant to configure the display regions.

FIG. 9 illustrates another embodiment of participant object 900. Participant object 900 may comprise a default configuration for the cube faces 304, 306, 308, and 310. For example, when a participant 112 enters the online conference for the first time, the conference user interface 112 may initially display the default configuration. Cube face 306 may be preconfigured with settings based on a user profile 126 (FIG. 1), although business card component 410 may be edited by selecting an edit button 906. Cube face 308 may be preconfigured to prompt the participant 112 to enter a personal greeting in text box 908 and add the message (add button 910) to the cube face 308. Cube face 310 may be preconfigured to prompt the participant 112 to link the cube face 310 to a social networking account by entering a username (text box 912), a password (text box 914), and adding the account (button 916).

Figure 10:
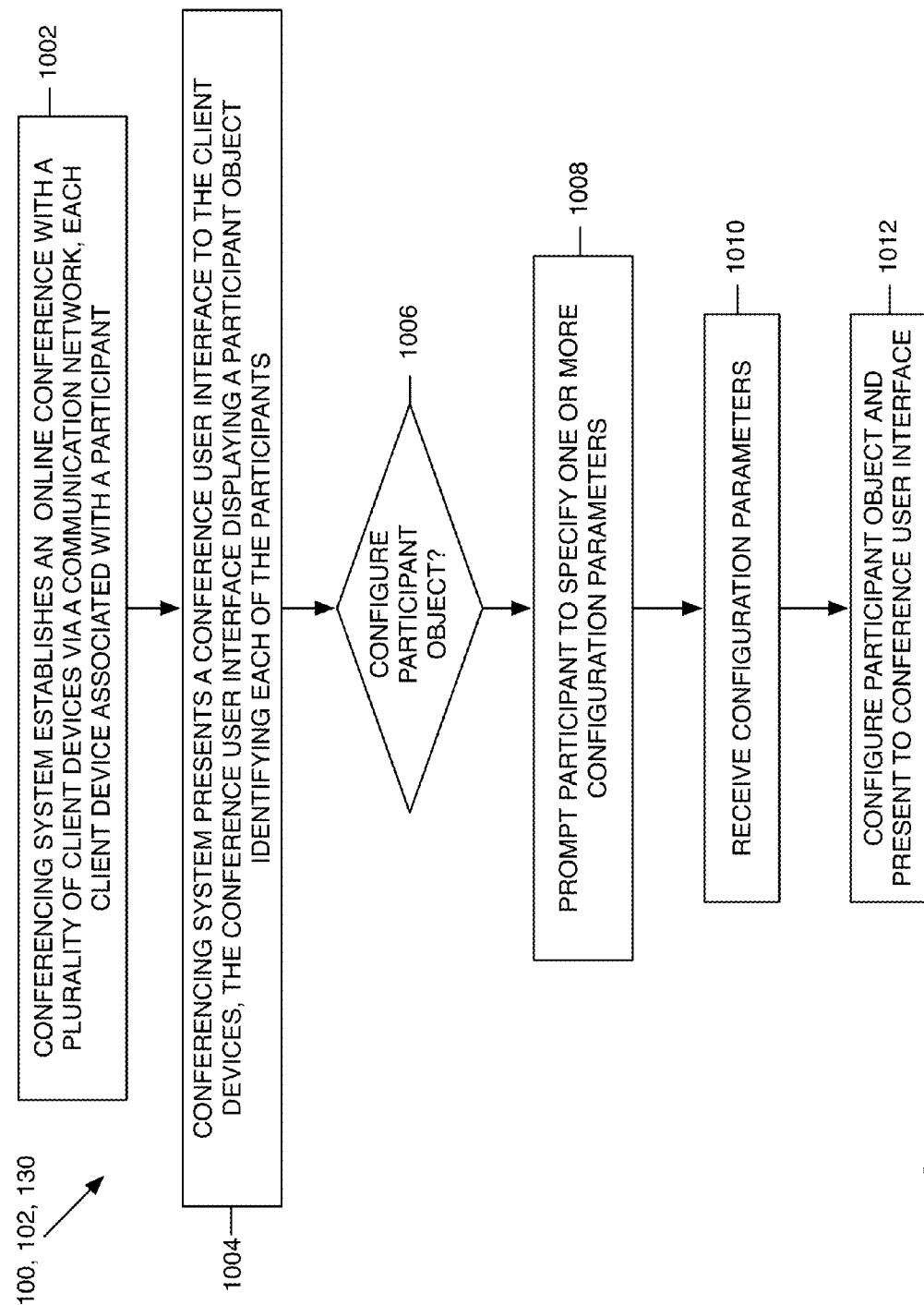
FIG. 10 is a flowchart illustrating the architecture, operation, and/or functionality of another embodiment of the participant customization module of FIG. 1.

FIG. 10 illustrates another embodiment of a method for enabling participants 112 to customize their virtual presence during the online conference. At block 1002, the conferencing system 102 establishes an audio conference 108 with the client devices 104a, 104b, and 104c via network(s) 106. At block 1004, the conferencing system 102 presents the conference user interface 114 to the client devices 104 with corresponding participant objects 302. At decision block 1006, the conferencing system 102 determines that a participant object 302 is to be customized. As described above, the participant 112 may initiate the customization process directly from the participant object 302. At block 1006, the conferencing system 102 may prompt the participant 112, via the conference user interface 114, to specify one or more configuration parameters. It should be appreciated that the participant 112 may specify the configuration parameter(s) in any of the ways described above. At block 1010, the conferencing system 102 receives the configuration parameters and may store the data in the participant's user profile 126. At block 1010, the conferencing system 102 configures the participant object 302 according to the specified configuration parameters and presents the customized participant object 302 in the conference user interface 114.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the computer system 100. Furthermore, the logical functions may be embodied in any computer readable medium for use by or in connection with an instruction execution system, apparatus, or device, such as a computer-based system, processor-containing system, or other system associated with the computer system 100 that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for customizing display of participant information in an online conference, the method comprising:
 a conferencing system establishing an online conference with a plurality of client devices via a communication network, each client device associated with a participant in the online conference;
 the conferencing system presenting a conference user interface to the client devices, the conference user interface displaying an interactive participant object identifying each of the participants, each interactive participant object comprising an interactive cube having a default display face and one or more foldable display faces; and
 during the online conference, receiving a selection of one of the plurality of interactive participant objects from one of the plurality of participants; and
 in response to the selection:
  modifying the selected interactive participant object from the default display face to display the one or more foldable display faces if the selecting participant comprises other than the identified participant associated with the selected interactive participant object; and
  enabling the selecting participant to customize presentation of the selected interactive participant object to the other participants if the selecting participant comprises the identified participant associated with the selected interactive participant object.

2. The method of claim 1, wherein the customizing presentation of the selected interactive participant object comprises launching a configuration panel for customizing the participant profile displayed via the selected interactive participant object.

3. The method of claim 1, wherein the one or more foldable display faces display one of a business card component, default identification information, and a social networking profile.

4. The method of claim 3, wherein the customizing presentation of the selected interactive participant object comprises launching a configuration panel for customizing the one or more expandable display faces.

5. The method of claim 1, wherein the enabling the selecting participant to customize presentation of the selected interactive participant object to the other participants if the selecting participant comprises the identified participant associated with the selected interactive participant object comprises selecting a configuration button displayed via the selected interactive participant object.

6. The method of claim 1, wherein the default display face displays an image associated with the corresponding participant.

7. A computer program embodied in a non-transitory computer readable medium and executable by a processor for providing an online conference, the computer program comprising:
 logic configured to establish an online conference with a plurality of client devices via a communication network, each client device associated with a participant in the online conference;
 logic configured to present a conference user interface to the client devices, the conference user interface displaying an interactive participant object identifying each of the participants, each interactive participant object comprising an interactive cube having a default display face and one or more foldable display faces;
 logic configured to receive a selection of one of the plurality of interactive participant objects from one of the plurality of participants; and
 in response to the selection:
  logic configured to modify the selected interactive participant object from the default display to display the one or more foldable display faces if the selecting participant comprises other than the identified participant associated with the selected interactive participant object; and
  logic configured to enable the selecting participant to customize presentation of the selected interactive participant object to the other participants if the selecting participant comprises the identified participant associated with the selected interactive participant object.

8. The computer program of claim 7, wherein the logic configured to customize presentation of the selected participant object to the other participants comprises launching a configuration panel in response to the selection of the interactive participant object.

9. The computer program of claim 7, wherein the default display face displays profile information identifying the participant.

10. The computer program of claim 7, wherein the one or more foldable display faces display one of a business card component, default identification information, a social networking profile, and a social networking feed.

11. The computer program of claim 10, wherein the customizing presentation of the selected interactive participant object comprises launching a configuration panel for customizing the one or more expandable display faces.

12. A computer system comprising:
 a conferencing system for establishing an audio conference with a plurality of client devices via a communication network; and
 a server configured to communicate with the conferencing system and the plurality of client devices via the communication network and present a conference user interface to the client devices which displays an interactive participant object identifying each of the participants, each interactive participant object comprising an interactive cube having a default display face and one or more foldable display faces, the server comprising one or more processors and a participant customization module, which is stored in a computer readable medium and executed by the processors for enabling the participants to customize presentation of the interactive participant objects, the participant customization module comprising:
 logic configured to receive a selection of one of the plurality of interactive participant objects from one of the plurality of participant and, in response to the selection: modify the selected interactive participant object from the default display face to display the one or more foldable display faces if the selecting participant comprises other than the identified participant associated with the selected interactive participant object; and enable the selecting participant to customize presentation of the selected interactive participant object to the other participants if the selecting participant comprises the identified participant associated with the selected interactive participant object.

13. The computer system of claim 12, wherein the one or more foldable display faces display one of a business card component, a social networking profile, and a social networking feed, and the customizing presentation of the selected participant object comprises launching a configuration panel for customizing the one or more foldable display faces.

* * * * *